Patented Jan. 6, 1925.

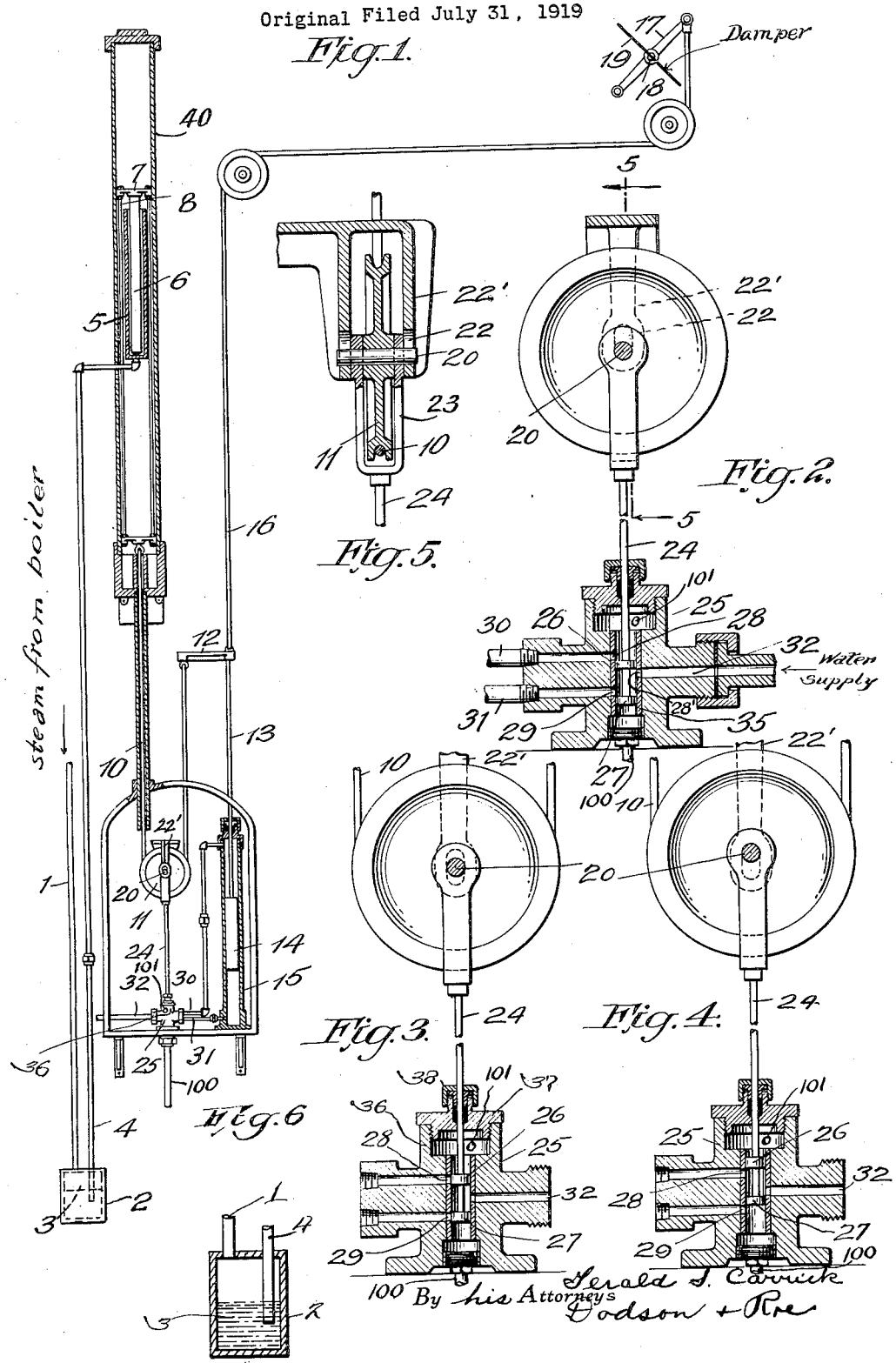

1,522,415

UNITED STATES PATENT OFFICE.

GERALD S. CARRICK, OF CHICAGO, ILLINOIS.

PRESSURE REGULATOR FOR USE IN CONNECTION WITH STEAM BOILERS.

Application filed July 31, 1919, Serial No. 314,432. Renewed April 22, 1922. Serial No. 556,134.

*To all whom it may concern:*

Be it known that I, GERALD S. CARRICK, a citizen of the United States, residing at Chicago, in the county of Cook and State of Illinois, have invented a certain new and useful Improvement in Pressure Regulators for use in Connection with Steam Boilers, of which the following is the specification.

My invention relates to that class which are designed to open and close a damper or to operate any other means for increasing or decreasing the combustion of coal in the fire box, thereby controlling the production of steam, and is more particularly designed to provide a device which will impart to the damper, a series of minute movements designed to open or close the same, but will not flop the damper from the wide open position to the tightly closed position.

Devices of this character which are designed for this purpose, are subject to the objection that they have no provision for moving heavy mechanism, and where a heavy damper, carrying 75 or 100 pounds is to be moved or where there is considerable friction on the moving parts, they are impractical and could not move the mechanism.

My invention has for its object to provide a device which will provide sufficient power to move any amount of mechanism, but which will permit the actuating mechanism to act only for that period of time which is necessary to restore the boiler pressure to the desired amount.

My means of accomplishing the foregoing objects may be more readily comprehended by having reference to the accompanying drawings which are heretunto annexed and made a part thereof, in which:

Fig. 1 is an assembled view partly in section to show my improved device arranged to operate a damper in a flue.

Figs. 2, 3 and 4, are sectional views of the operating mechanism showing the various positions produced by variations of the steam pressure. Fig. 5 is a fragmentary detail view. Fig. 6 is a sectional view of the mercury reservoir.

As shown in the drawings, a pipe 1 is connected to a steam boiler and leads to a reservoir 2 in which is placed a quantity of mercury 3. Another pipe 4 extends into the reservoir 2 and down into the mercury 3. This pipe 4 leads through suitable connections to a second reservoir formed by a cylinder 5 in which is mounted a control member or float 6. The upper end of the float 6 may be connected by means of a suitable rod 7 to a yoke 8, the opposite end of which is suitably connected to a cable 10 which extends downwardly and around a wheel 11, which corresponds to a floating lever. The cable having passed around the wheel 11, extends upwardly and is secured to an arm 12 which is fixedly fastened to a piston rod 13. Independent power means are provided for moving the piston rod 13 in order to move the cable 16 and thus operate the damper. Such independent power means I have here shown as including a piston 14 operatively mounted inside of a hydraulic cylinder 15, adapted to be operated by any suitable or convenient source of water supply or other pressure. The other end of the piston rod 13 is connected to a cable 16, which extends to an arm 17 which is secured to the shaft 18 of the damper 19. The wheel 11 is mounted upon a shaft 20 which is vertically slidable in guides 22, formed in a bracket 22', which may be secured to any desired fixed wall or frame. The axle 20, is journaled in bearings formed in a bifurcated member 23, which is fixedly connected to a piston rod 24. This rod extends down into a four-way valve 25, and carries pistons 26 and 27 which are adapted to close ports 28 and 29, formed in a cylinder 35, mounted in the valve body. These ports are connected by means of suitable pipe connections to the upper and lower ends 30 and 31 of the cylinder 15. A port or passage 32, leads to the port or passage 28' in the cylinder 35. This port is connected in any suitable or convenient way to source of water supply (not shown). The valve is provided with a vertical extension 36 to which is fitted the usual cap 37 which is provided with a suitable stuffing box 38 for the piston rod 24. The four-way valve just described operates to control the entry of water into the cylinder 15 and thus control the movement of the piston 14. Such valve may therefore be referred to as power controlling means, since it controls the power which is used to operate the damper.

The operation of the device is as follows: The steam from the boiler enters through the pipe 1 into the reservoir 2, and presses upon the mercury. As the pressure rises, the mercury will be forced upwardly through the pipe 4, and into the cylinder 5. Assuming that the weight of mercury at this time is sufficient to balance the normal or desired steam pressure on the boiler, it will be obvious that as the steam pressure rises that it will, in like manner, raise the level of the mercury in the cylinder 5. As this movement takes place, it necessarily follows that the float 6 will be moved upwardly carrying with it the yoke 8, and this will operate to move the cable 10, upwardly so that the wheel 11 which forms the floating lever, will be caused to move upwardly, carrying with it the rod 24, and it will open the port 28, thus permiting the water to flow through the port 32 into the cylinder 35 and out of the port 28, through the pipe 30, to the upper end of the hydraulic cylinder 15. This will cause the piston 14 to move downwardly, carrying with it the rod 13, and the cable 16. This will exert a pressure upon the arm 17 and shift the position of the damper 19, thus decreasing the combustion in the boiler. This motion, however, will continue so long as the port 28 remains open, but it will be apparent that as the piston 14 moves downwardly, carrying with it the rod 13, it will also carry the arm 12, and this will permit the wheel 11 to move downwardly, and consequently will move the piston 26 downwardly until the port 28 is closed, at which time the imaginary floating lever will assume the position shown in Fig. 3. When the pressure falls, it will be obvious that the mercury will flow down from the cylinder 5, into the reservoir 2, and this will lower the wheel or floating lever 11, which will cause the rod 24 to move downwardly, causing the piston 27 to uncover the port 29, (see Fig. 2) thus permitting the water to flow through the port 32 into the cylinder 35, whence it travels through the port 29 through the pipe 31 to the lower end of the hydraulic cylinder 15. This will move the piston 14 upwardly, and will correspondingly elevate the rod 13 and permit the counterweight to swing the damper 19 open. This upward movement of the rod 13 necessarily carries the arm 12 and serves to raise the wheel or floating lever 11, carrying with it the rod 24 until the piston 27 closes the ports, and the further movement of the piston 14 is prevented. At this point the parts will assume the position indicated in Fig. 3.

From the foregoing description, it will be apparent to persons skilled in the art that the slightest variation in the pressure of the boiler results in the producing of a series of minute movements of the pistons 26 and 27, and that a very minute movement is all that is necessary or required to uncover either one of the ports 28 or 29, permitting the water to flow into the hydraulic cylinder 15. From this it follows that it becomes possible to hold steam pressure almost constant; at the same time it will be observed that if the closing movement of the damper does not produce the desired result and the pressure continues to rise that the mercury will continue to be forced into the cylinder 5, and the float will be correspondingly elevated, thus raising the yoke 7 and causing the wheel to open the ports still wider and thus through the medium of the piston rod 24 to cause a more extended movement of the piston 14 in the cylinder 15, and a correspondingly greater movement of the damper in the flue.

It will also be apparent to persons skilled in the art from the foregoing description, that I do not rely upon the weight of the mercury to move the damper, but that the only thing the mercury has to move is the pistons 26 and 27 and the floating lever 11, the damper being shifted by the movement of the piston 14 in the hydraulic cylinder; and as this piston may be of any desired size, it is possible to provide a sufficiently powerful actuated mechanism to move any size of damper and to overcome any inertia or undue friction which the parts may possess. It may be found desirable in practice to provide a hood 40, to enclose the float and float case.

In the four-way valves, suitable vents are provided, as indicated by 100 and 101.

Having described my invention what I regard as new and desire to secure by Letters Patent of the United States, is:

1. A fluid pressure regulator comprising a reservoir, means to connect said reservoir to a steam boiler, a second reservoir above the first, suitable pipe connections between the two, a float in the second reservoir, means to connect said float with a yoke, a fluid in the first reservoir which is caused to flow by the pressure of the steam into the second reservoir thereby moving the float up and down, a cable connecting said yoke to a wheel operating as a floating lever, an axle for said wheel, a hydraulic cylinder, a piston therein, a rod to which said piston is secured, an arm carried by said rod to which the other end of the cable is secured, means to connect said rod to combustion controlling apparatus, a valve, a cylinder in said valve, there being ports or passages leading from said cylinder and suitably connected to the upper and lower ends of the hydraulic cylinder, pistons in said cylinder adapted to close said ports, a rod carrying said pistons, means to secure said rod to the axle of said wheel, and means to connect said valve to a source of water supply.

2. A pressure regulator for steam boilers, comprising a steam boiler, a reservoir containing a fluid, means extending into the reservoir to connect it with the boiler, a cylinder, means leading to said cylinder, a float mounted in the cylinder, a yoke, the upper end of the float being connected to the said yoke, a guide, a shaft vertically slidable therein, a wheel mounted upon said shaft, a cable passing around said wheel and extending upwardly, the lower end of said yoke being connected to said cable, a rod, an arm fixedly attached to said rod to which said cable is secured, a hydraulic cylinder, a piston operatively mounted inside of said cylinder and attached to the lower end of the rod, a cable to which the upper end of the rod is connected, an arm extending therefrom, a damper, a shaft therefor, an arm secured to said shaft, a valve, a downwardly extending rod extending into said valve, a bifurcated member fixedly connected to said downwardly extending rod, journal bearings formed in said cylinder, a cylinder mounted in the valve body, ports formed in said cylinder, pistons carried by said rod adapted to open and close said ports, and means to connect said ports to a source of water supply.

3. A fluid pressure regulator comprising a reservoir, means to connect said reservoir to a steam boiler, a second reservoir above the first, suitable pipe connections between the two, a float in the second reservoir, means to connect said float with a yoke, a fluid in the first reservoir which is caused to flow by the pressure of the steam into the second reservoir thereby moving the float up and down, a wheel operating as a floating lever, a cable connecting said yoke to said wheel, a power actuated device, a valve, means to connect said power actuated device to the combustion regulating apparatus, means operated by the floating lever to permit the flow of the medium to actuate the power actuated device, and means to connect the other end of said cable to the power actuated device.

4. A fluid pressure regulator comprising a reservoir, means to connect said reservoir to a steam boiler, a second reservoir above the first, suitable pipe connections between the two, a float in the second reservoir, means to connect said float with a yoke, a fluid in the first reservoir which is caused to flow by the pressure of the steam into the second reservoir thereby moving the float up and down, a cable connecting said yoke to a wheel operating as a floating lever, an axle for said wheel, a hydraulic cylinder, a piston therein, a rod to which said piston is secured, an arm carried by said rod to which the other end of the cable is secured, means to connect said rod to combustion apparatus, a valve, a cylinder in said valve, there being ports or passages leading from said cylinder and suitably connected to the upper and lower ends of the hydraulic cylinder, pistons in said cylinder adapted to close said ports, a rod carrying said pistons, means to secure said rod to the axle of said wheel, and means to connect said valve to a source of water supply.

5. A fluid pressure regulator comprising a reservoir, means to connect said reservoir to a steam boiler, a second reservoir above the first, suitable pipe connections between the two, a float in the second reservoir, means to connect said float with a yoke, a fluid in the first reservoir which is caused to flow by the pressure of the steam into the second reservoir thereby moving the float up and down as the pressure varies, a wheel operating as a floating lever, a cable connecting said yoke to said wheel, an axle on which said wheel rotates, guides to permit a vertical movement of said axle, a hydraulic cylinder, a piston therein, a rod to which said piston is secured, an arm carried by said rod to which the other end of the cable is secured, means to connect said rod to combustion controlling apparatus, a valve, a cylinder in said valve, there being ports or passages leading from said cylinder and suitably connected to the upper and lower ends of the hydraulic cylinder, pistons in said cylinder adapted to close said ports, a rod carrying said pistons, means to secure said rod to the axle of said wheel, and means to connect said valve to a source of water supply.

6. In a device of the character described, a hydraulic cylinder, a piston therein, a rod to which said piston is secured, means to connect said rod to combustion controlling apparatus, a valve, a cylinder in said valve, pistons in said cylinder adapted to close the outlet ports in said cylinder, said ports being suitably connected to the upper and lower ends of the hydraulic cylinder, a rod carrying said piston, a floating lever, means to connect said rod to said floating lever, a reservoir, a second reservoir above the first, means to connect the two, a series of means initially actuated by the steam pressure of the boiler connected to one end of said floating lever, and means to connect the other end of said floating lever to the piston rod of the hydraulic cylinder.

7. A fluid pressure regulator comprising a steam boiler, a reservoir, means to connect said reservoir to the steam boiler, a second reservoir above the first, suitable pipe connections between the two, a float in the second reservoir, a fluid in the first reservoir the level of which is varied by the variation of the steam pressure whereby the float is caused to be moved vertically, a yoke connected to said float, a cable connected to said yoke, a wheel operating as a floating lever carried by said cable, a hydraulic cylinder, means actuated by the floating lever to admit water to the upper and lower ends of said hydraulic cylinder, a piston in said cylinder, a piston rod for said piston, and means to connect said rod to said floating lever and to combustion controlling apparatus.

8. In a device of the character described, a control member actuated by changes in pressure in a boiler and adapted to assume a set controlling position with respect to every different boiler pressure within a fixed range, a combustion controlling member, independent power means for actuating the combustion controlling member, and power controlling means actuated by the pressure actuated control member for starting operation of the power means to change the position of the combustion controlling member, said power controlling means also adapted to be actuated by the independent power means to stop operation of said power means upon the combustion controlling member reaching a position relative to the setting of the pressure actuated control member.

9. In a device of the character described, a control member actuated by changes in pressure in a boiler and adapted to assume a set controlling position with respect to every different boiler pressure within a fixed range, a combustion controlling member, independent power means for actuating the combustion controlling member, power controlling means actuated by the pressure actuated control member for starting operation of the power means to change the position of the combustion controlling member, and power controlling means actuated by the independent power means to stop operation of said power means upon the combustion controlling member reaching a position relative to the setting of the pressure actuated control member.

10. In a device of the character described, a control member actuated by changes in pressure in a boiler and adapted to assume a set controlling position with respect to every different boiler pressure within a fixed range, a combustion controlling member, independent power means for actuating the combustion controlling member, a floating lever actuated by the pressure actuated control member, and means operated by movement of the floating lever for controlling the power means, said floating lever also actuated by said power means.

11. In a device of the character described, a control member actuated by changes in pressure in a boiler and adapted to assume a set controlling position with respect to every different boiler pressure within a fixed range, a combustion controlling member, independent power means for actuating the combustion controlling member, power controlling means, and a floating lever connected to the power controlling means, said floating lever adapted to be actuated by the pressure actuated control member to start operation of the power means to change the position of the combustion controlling member, and said floating lever also adapted to be actuated by said power means to stop operation of said power means upon the combustion controlling member reaching a position relative to the setting of the pressure actuated control member.

12. In a device of the character described, a combustion controlling member, independent power means for actuating the combustion controlling member, power controlling means, means actuated by changes in pressure in a boiler and adapted to assume a set controlling position with respect to every different boiler pressure within a fixed range for actuating said power controlling means to start operation of the power means to change the position of the combustion controlling member, and means actuated by said power means for actuating said power controlling means to stop operation of said power means.

13. In a device of the character described, a combustion controlling member, independent power means for moving the combustion controlling member, and means actuated by variations of pressure in the boiler and adapted to assume a set controlling position with respect to every different boiler pressure within a fixed range for causing said independent power means to move the combustion controlling member to a position relative to the pressure in the boiler.

14. In a device of the character described, a combustion controlling member, independent power means for actuating the combustion controlling member, power controlling means, a reservoir containing fluid, means for changing the height of fluid in the reservoir in accordance with variations in the pressure in the boiler, and means whereby said changes in the height of fluid in the reservoir actuate the power controlling means to cause said independent power means to move the combustion controlling member to a position relative to each height of said fluid in said reservoir.

15. In a device of the character described, a combustion controlling member independent power means for actuating the combustion controlling member, a reservoir containing fluid, means for changing the height of fluid in the reservoir in accordance with variations in the pressure in the boiler, and means acting through the independent power means whereby each height of fluid in the reservoir causes the combustion controlling member to take a position corresponding thereto.

16. In a device of the character described, a float actuated by changes in pressure in a boiler and adapted to assume a set controlling position with respect to every different boiler pressure within a fixed range, a combustion controlling member, independent power means for actuating the combustion controlling member, and power controlling means actuated by the float and also by movement of the independent power means.

17. In a device of the character described, a control member actuated by changes in pressure in a boiler and adapted to assume a set controlling position with respect to every different boiler pressure within a fixed range, a combustion controlling member, independent power means for actuating the combustion controlling member, and a four-way valve controlling the independent power means, said four-way valve adapted to be moved from a neutral position to an open position by movement of the control member and moved back again from open position to a neutral position by corresponding movement of the independent power means.

18. In a device of the character described, a combustion controlling member, independent power means for moving the combustion controlling member, means actuated by variations of pressure in the boiler and adapted to assume a set controlling position with respect to every different boiler pressure within a fixed range for causing said independent power means to move to a position relative to each pressure in the boiler.

19. In a device of the character described, a control member actuated by changes in pressure in a boiler and adapted to assume a set position with respect to every different boiler pressure within a fixed range, independent power means, power controlling means actuated by the pressure actuated control member for starting operation of the power means, said power controlling means also adapted to be actuated by the independent power means to stop operation of said power means upon said power means reaching a position relative to the setting of the pressure actuated control member.

20. In a device of the character described, a column of liquid balanced against the steam pressure in a boiler whereby changes in pressure cause corresponding variations in the height of the column of liquid, a combustion controlling member, independent power means for actuating the combustion controlling member, and power controlling means actuated by a change in height of said column of liquid for starting operation of the power means to change the position of the combustion controlling member, said power controlling means also adapted to be actuated by the power means to stop operation of said power means upon the combustion controlling member reaching a position corresponding to the height of the column of liquid.

21. In a device of the character described, a column of liquid balanced against the steam pressure in a boiler whereby changes in pressure cause corresponding variations in the height of the column of liquid, a combustion controlling member, independent power means for actuating the combustion controlling member, power controlling means, a floating lever actuated by a change in the height of said column of liquid, and means operated by movement of the floating lever for controlling the power means, said floating lever also actuated by said power means.

22. In a device of the character described, a column of liquid balanced against the steam pressure in a boiler whereby changes in pressure cause corresponding variations in the height of the column of liquid, a combustion controlling member, independent power means for actuating the combustion controlling member, and means for causing said independent power means to move the combustion controlling member to a position corresponding to each height of said column of liquid.

23. In a device of the character described, a column of liquid balanced against the steam pressure in a boiler whereby changes in pressure cause corresponding variations in the height of the column of liquid, a combustion controlling member, independent power means for actuating the combustion controlling member, and means acting through the independent power means whereby each height of the column of liquid causes the combustion controlling member to take a position corresponding thereto.

24. In a device of the character described, a column of liquid balanced against steam pressure in a boiler whereby changes in pressure cause corresponding variations in the height of the column of liquid, a combustion controlling member, independent power means for actuating the combustion controlling member, and power controlling means actuated by variations in the height of the column of liquid and also by movement of the independent power means.

25. In a device of the character described, a column of liquid balanced against the steam pressure in a boiler whereby changes in pressure cause corresponding variations in the height of the column of liquid, a combustion controlling member, independent power means for actuating the combustion controlling member, and a four-way valve controlling the independent power means, said four-way valve adapted to be moved from a neutral position to an open position by a variation in the height of the liquid and moved back again from open position to neutral position by a corresponding movement of the independent power means.

26. In a device of the character described, a column of liquid balanced against the steam pressure in a boiler whereby changes in pressure cause corresponding variations in the height of the column of liquid, a float on said column of liquid, a combustion controlling member, independent power means for actuating the combustion controlling member, and power controlling means actuated by a change in height of said float for starting operation of the power means to change the position of the combustion controlling member, said power controlling means also adapted to be actuated by the power means to stop operation of said power means upon the combustion controlling member reaching a position corresponding to the height of the float.

27. In a device of the character described, a column of liquid balanced against the steam pressure in a boiler whereby changes in pressure cause corresponding variations in the height of the column of liquid, a float on said column of liquid, a combustion controlling member, independent power means for actuating the combustion controlling member, and means for causing said independent power means to move the combustion controlling member to a position corresponding to each height of said float.

28. In a device of the character described, a column of liquid balanced against the steam pressure in a boiler whereby changes in pressure cause corresponding variations, in the height of the column of liquid, a float on said column of liquid, a combustion controlling member, independent power means for actuating the combustion controlling member, and means acting through the independent power means whereby each height of the float causes the combustion controlling member to take a position corresponding thereto.

29. In a device of the character described, a column of liquid balanced against the steam pressure in a boiler whereby changes in pressure cause corresponding variations in the height of the column of liquid, a float on said column of liquid, a combustion controlling member, independent power means for actuating the combustion controlling member, and power controlling means actuated by variations in the height of the float and also by movement of the independent power means.

30. In a device of the character described, a column of liquid balanced against the steam pressure in a boiler whereby changes in pressure cause corresponding variations in the height of the column of liquid, a float on said column of liquid, a combustion controlling member, independent power means for actuating the combustion controlling member, and a four-way valve controlling the independent power means, said four-way valve adapted to be moved from a neutral position to an open position by a variation in the height of the float and moved back again from open position to neutral position by a corresponding movement of the independent power means.

In testimony whereof, I have signed the foregoing specification.

GERALD S. CARRICK.